United States Patent
Yen et al.

(10) Patent No.: US 7,175,144 B2
(45) Date of Patent: Feb. 13, 2007

(54) DETACHABLE BASE SUPPORT

(75) Inventors: Ching-Hui Yen, Shindian (TW); Ting-Hui Chih, Hualien (TW); Chi-Cheng Ho, Taipei (TW); Han-Kuang Ho, Junghe (TW)

(73) Assignee: Benq Corporation, Taoyuan (TW)

( * ) Notice: Subject to any disclaimer, the term of this patent is extended or adjusted under 35 U.S.C. 154(b) by 130 days.

(21) Appl. No.: 10/453,178

(22) Filed: Jun. 2, 2003

(65) Prior Publication Data

US 2003/0230693 A1 Dec. 18, 2003

(30) Foreign Application Priority Data

Jun. 18, 2002 (TW) .............................. 91209106 U
Feb. 19, 2003 (TW) .............................. 92202614 U (51) Int. Cl.
*A47B 96/00* (2006.01)

(52) U.S. Cl. .............................. 248/221.11; 248/224.8; 292/170; 292/DIG. 37

(58) Field of Classification Search .......... 248/221.11, 248/221.12, 222.11, 222.13, 224.8, 519, 910, 248/349.1, 346.01, 346.03, 346.3, 346.5, 248/357; 292/170, DIG. 37; 403/49, 326, 403/327, 328, DIG. 4
See application file for complete search history.

(56) References Cited

U.S. PATENT DOCUMENTS 1,257,998 A * 3/1918 Gruber ..................... 292/170
3,061,325 A * 10/1962 Glass ........................ 280/613
3,737,184 A * 6/1973 Swartz ...................... 292/170
3,918,732 A * 11/1975 Wulf ......................... 280/618
4,880,191 A * 11/1989 Lake, Jr. ................... 248/371
4,898,493 A * 2/1990 Blankenburg .............. 403/326
4,971,281 A * 11/1990 Steinbeck ............... 248/222.13
5,348,268 A * 9/1994 Klein ......................... 248/681
5,398,157 A * 3/1995 Paul .......................... 361/684
5,538,213 A * 7/1996 Brown ................. 248/222.11
5,626,374 A * 5/1997 Kim .......................... 292/170
5,820,091 A * 10/1998 Kutscher ............... 248/220.21
6,010,111 A   1/2000 Cho
6,029,940 A * 2/2000 Klein .................... 248/346.04
6,138,968 A * 10/2000 Svantesson et al. ... 248/222.13

FOREIGN PATENT DOCUMENTS

| CN | 2302575 Y | 12/1998 |
|---|---|---|
| CN | 1341878 | 3/2002 |
| CN | 2560034 Y | 7/2003 |
| TW | 231828 | 10/1993 |
| TW | 257418 | 11/1994 |
| TW | 331454 | 9/1996 |

* cited by examiner

*Primary Examiner*—Korie Chan
(74) *Attorney, Agent, or Firm*—Shell & Wilmer L.L.P.

(57) ABSTRACT

The invention provides a detachable base support including a support, a base plate, and a latch. The support includes a protrusion which has a latch hole. The base plate has a receiving space for accommodating the protrusion. The latch is movably connected to the base plate. When the protrusion is inserted into the receiving space, the latch moves to a first position allowing a portion of the latch to pass through the latch hole for fixing the support onto the base plate.

23 Claims, 7 Drawing Sheets

DETACHABLE BASE SUPPORT

CROSS REFERENCE TO RELATED APPLICATIONS

This application claims priority to Taiwan Patent Application No. 091209106 entitled "Detachable Base Support", filed Jun. 18, 2002, and Taiwan Patent Application No. 092202614 entitled "Detachable Base Support", filed Feb. 19, 2003.

FIELD OF INVENTION

The present invention generally relates to a base support and, more particularly, to a detachable base support for a flat monitor.

BACKGROUND OF THE INVENTION

Monitor devices play a very important role in the information system of modern society. One of many auxiliary components of the monitor device, such as a base support, is configured to support the monitor in a desired position and allow the monitor to provide different view angles for various occasions. As the size and weight of monitor devices increases with the development of technology, there is a demand to reinforce the strength of the base support for supporting the enlarged monitor device, and therefore the increase in dimension of the base support is inevitable. However, base supports of large scale increase the packing costs and occupy more space during transportation. Therefore, a detachable base support is proposed. The conventional detachable base support includes a support and a base plate. The support, which is connected to the base plate, is configured to support the monitor device.

Conventional detachable base supports generally employ hooks or screws cooperated with slots to fix the support onto the base plate. These conventional connection mechanisms however lead to some problems. For example, using hooks to fix the support onto the base plate reduces the strength of a base support, so that the monitor device mounted on the base support sways easily. On the other hand, using screws to fix the support onto the base plate makes it difficult to detach them from each other. When the support needs to be detached from the base plate, auxiliary tools are required to remove the screws, which complicates the detachment process. Therefore, there is a need to provide a detachable base support, which diminishes the problems described above.

SUMMARY OF THE INVENTION

It is an aspect of the present invention to provide a detachable base support, which implements the mechanism of a latch and a latch hole to enhance the strength of connection between a support and a base plate.

It is another aspect of the present invention to provide a detachable base support for use with a monitor device, which implements a movable latch provided on a base plate to selectively detachably connect a support and the base plate.

It is a further aspect of the present invention to provide a detachable base support for use with a flat monitor, which implements the mechanism of a hook and a base plate to provide a support point for exerting force to detach a support from the base plate.

It is another further aspect of the present invention to provide a detachable base support, which includes an elasticity mechanism and an actuator. The force provided by the elasticity mechanism and the function of the actuator make a latch automatically received in or detached from the latch hole, so that the support and the base plate are connected or detached from each other.

In one embodiment of the present invention, a detachable base support includes a support, a base plate, and a latch. The support has a protrusion, which has a latch hole. The base plate has a space for accommodating the protrusion. The latch is movably connected to the base plate. When the protrusion is inserted into the space, the latch moves to a first position allowing the latch to pass through the latch hole to fix the base plate onto the support.

In another embodiment, the detachable base support further includes an elasticity mechanism and an actuator. The elasticity mechanism provided on the base plate is configured to provide a force to move the latch to the first position. Moreover, the latch further includes a positioning hole. The actuator passes through the base plate and is located within the positioning hole to touch against the latch. When the actuator is actuated, the latch moves relative to the actuator, such as moving away from the first position where the latch is positioned out of the latch hole so as to allow the base plate to be detachable from the support.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention provides a detachable base support for use with a monitor device. The detachable base support includes a support, a base plate and a latch. The support has a protrusion. The protrusion has a latch hole. The base plate has a guiding structure and a space. The space is provided for accommodating the protrusion. The latch is movably received in the guiding structure. When the protrusion is inserted into the space, the guiding structure guides the latch to move to a first position, which allows the latch to pass through the latch hole for fixing the base plate onto the support.

Figure 1A:
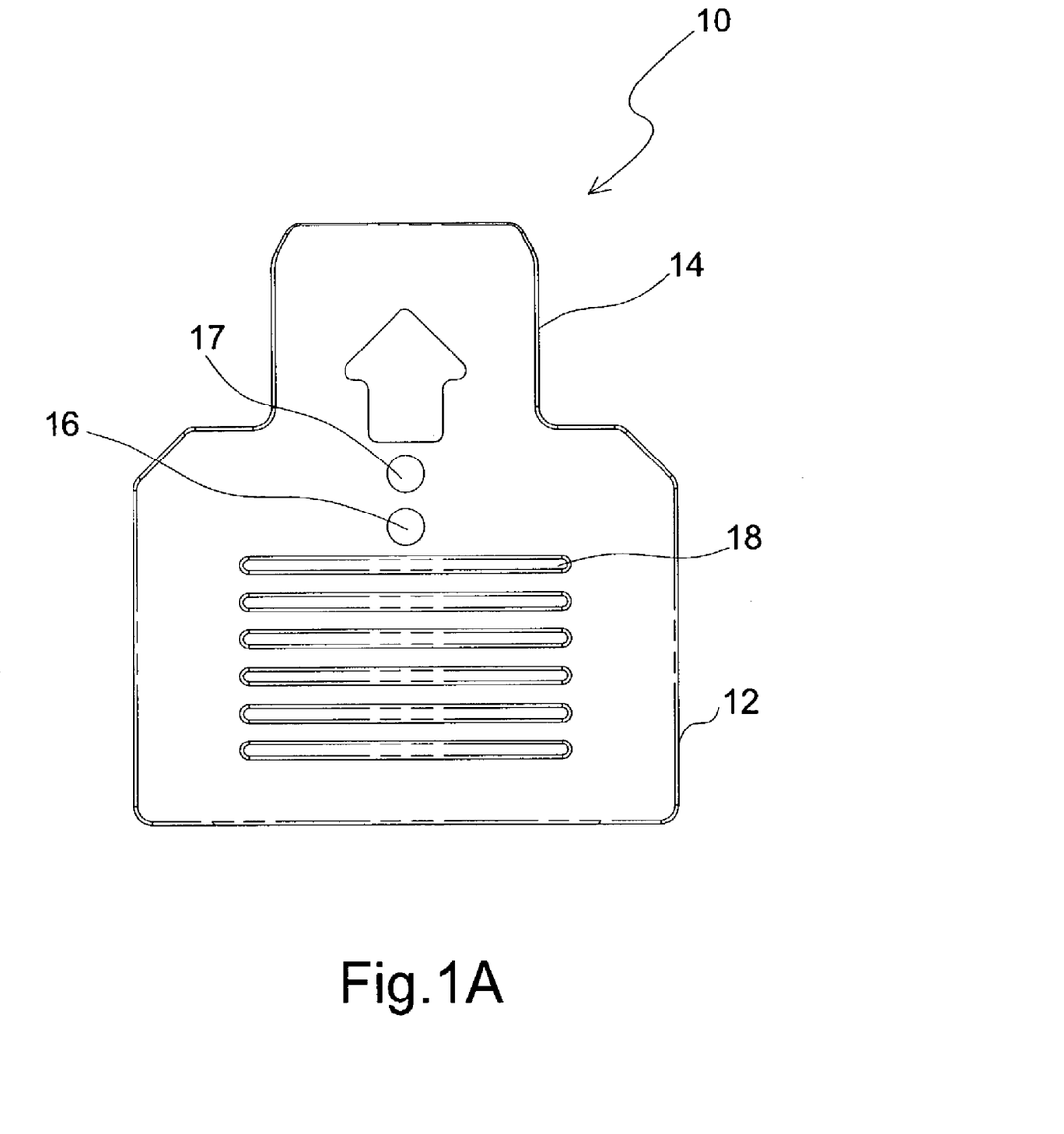
FIG. 1A illustrates an exemplary latch in a first embodiment of the present invention.

FIG. 1A illustrates a schematic view of an exemplary latch. In one embodiment, the latch 10 includes a wider portion 12, a narrower portion 14, and two positioning holes 16 and 17. The wider portion 12 has a rough surface, such as a surface with raised bars 18, for increasing friction when a user moves the latch with fingers. The positioning holes 16, 17 are configured to receive a bump provided on a base plate for positioning the latch, which will be described later. It is noted that the shape of the latch 10 is not limited to the geometric configuration constituted by the wider portion 12 and the narrower portion 14. Accordingly, the locations of the positioning holes 16, 17 and the raise bars 18 are not limited to be in the wider portion 12 or the narrower portion 14. Furthermore, the shape of the positioning holes 16, 17 can be any shape, which is able to receive or engage the bump on the base plate, and therefore is not limited to the embodiment shown in FIG. 1A.

Figure 1B:
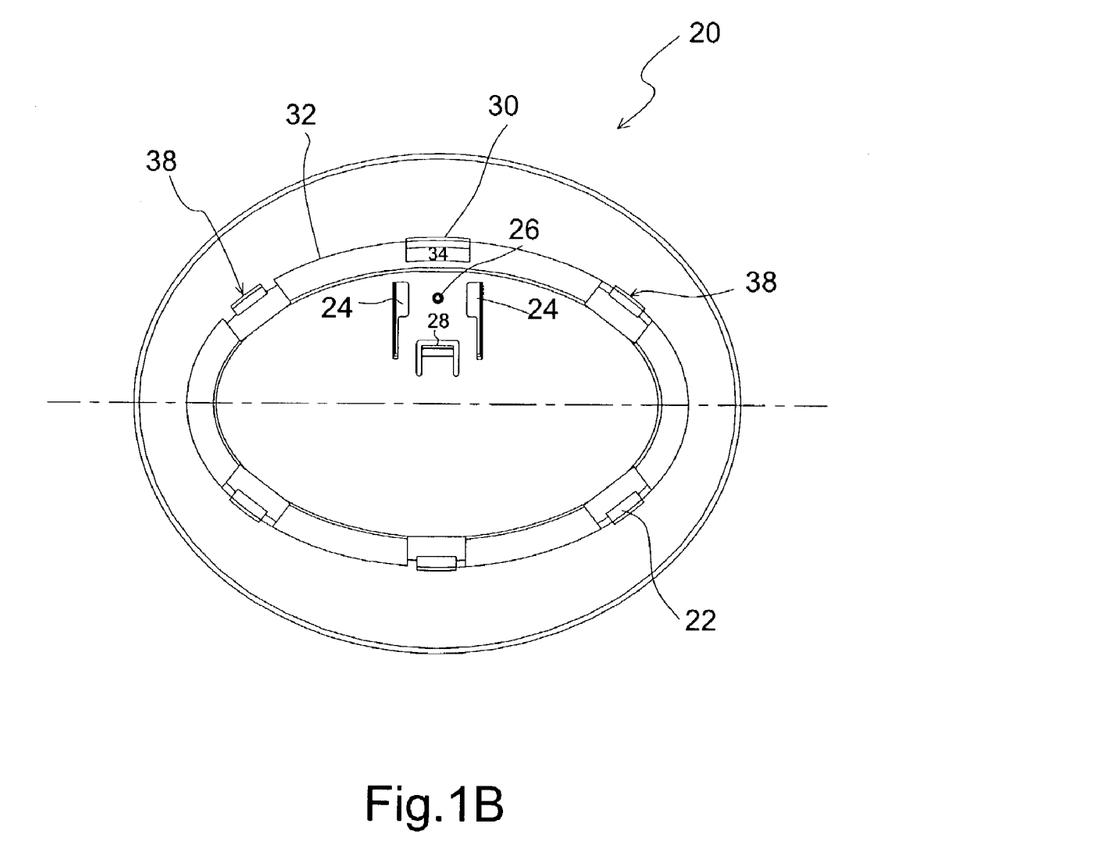
FIG. 1B illustrates an exemplary base in the first embodiment of the present invention.

FIG. 1B illustrates a bottom view of an exemplary base plate of the present invention. In one embodiment, the base plate 20 includes a guiding structure 24, a bump 26, a hook 22, a hook 38, a stopper 28, and a space 30. The guiding structure 24 provided on the base plate 20, is configured to accommodate the latch 10 of FIG. 1A so as to connect the latch 10 and the base plate 20. When the latch 10 is movably connected to the guiding structure 24, the latch 10 is guided to move to different positions on the base plate 20. The bump 26 is provided on the base plate 20. In this embodiment, the bump 26 is located within the guiding structure 24. To cooperate with the positioning holes 16, 17, the bump 26 can retain the latch 10 in different positions. The stopper 28 is provided on the base plate 20 for positioning the latch 10 on the base plate 20. In this embodiment, the stopper 28 is located within the guiding structure 24.

The space 30 of the base plate 20 is provided for accommodating a protrusion of a support, which is described in the following paragraph. In this embodiment, the space 30 is arranged on one side of the latch, which is guided by the guiding structure 24. Furthermore, The base plate 20 defines a central reference axis. The hook 22 is provided on an opposite side of the base plate 20 relative to the space 30 with respect to the central reference axis. The hook 38 is provided on the same side of the base plate 20 relative to the space 30 with respect to the central reference axis. The hook 22 and the hook 38 respectively include clips of different slopes. A reinforced structure 32 is provided to reinforce the structure of the base plate 20. Accordingly, the reinforced structure 32 has an opening 34 for allowing the latch 10 to pass through.

Figure 1C:
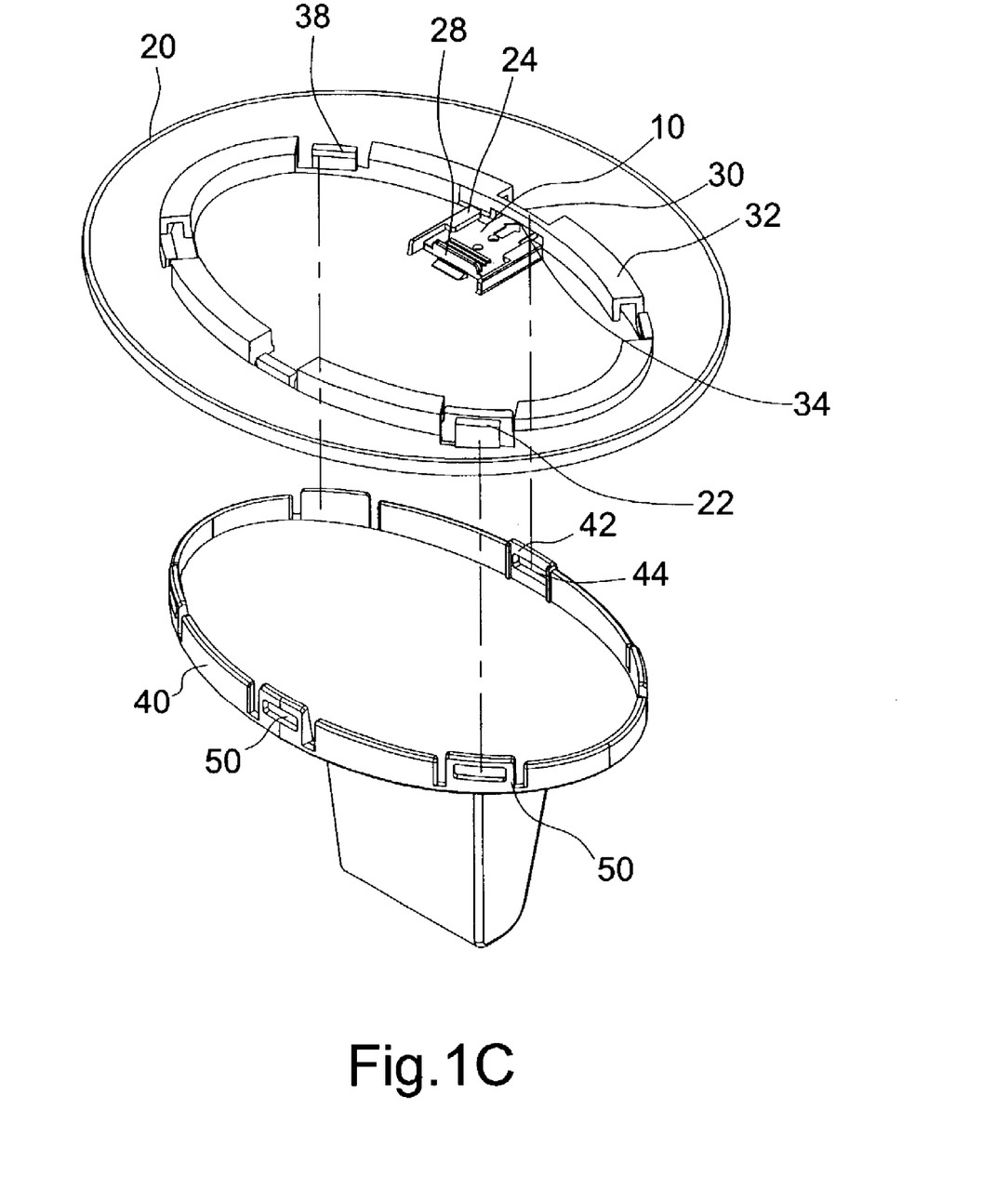
FIG. 1C illustrates an explosive view of a detachable base support in the first embodiment of the present invention.

FIG. 1C illustrates an explosive view of an exemplary support and the base plate 20. As shown in FIG. 1C, the latch 10 is movably connected to the base plate 20. The support 40 includes at least one protrusion 42 and a plurality of holes 50. The protrusion 42 has a latch hole 44 for allowing the narrower portion of the latch 10 to pass through. It is noted that the protrusion 42 provided on the support 40 corresponds to the space 30 of the base plate 20. When the base plate 20 and the support 40 are connected, the protrusion 42 is accommodated in the space 30 of the base plate 20. The holes 50 respectively correspond to the hook 22 and the hook 38 of the base plate 20. When the protrusion 42 is accommodated in the space 30 of the base plate 20, holes 50 respectively engage with hooks 22 and 38.

Figure 2A:
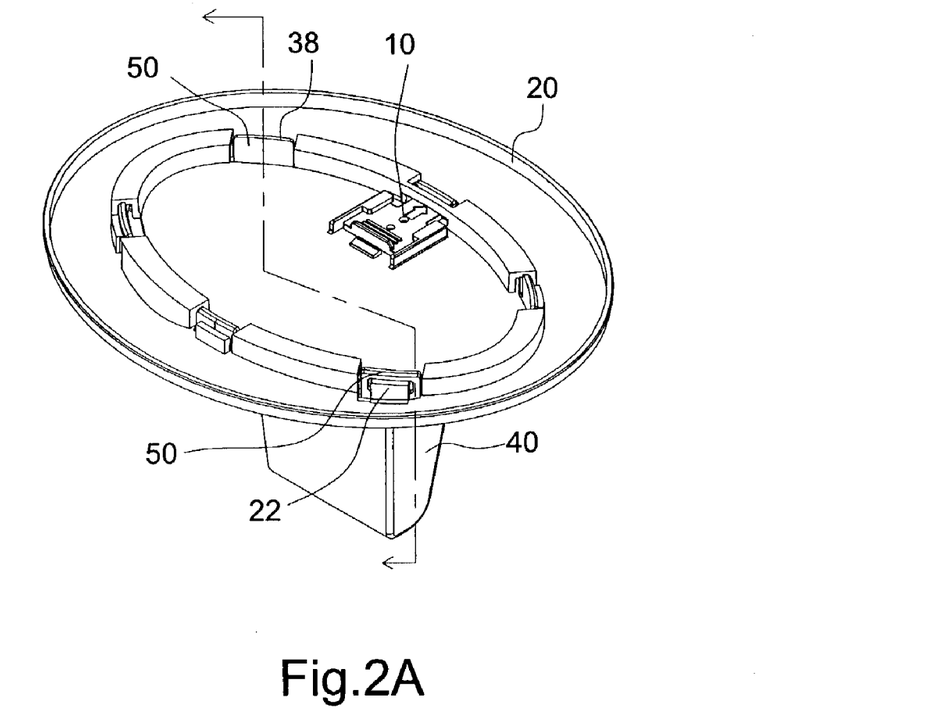
FIG. 2A illustrates a perspective view of the detachable base support of FIG. 1C.
Figure 2B:
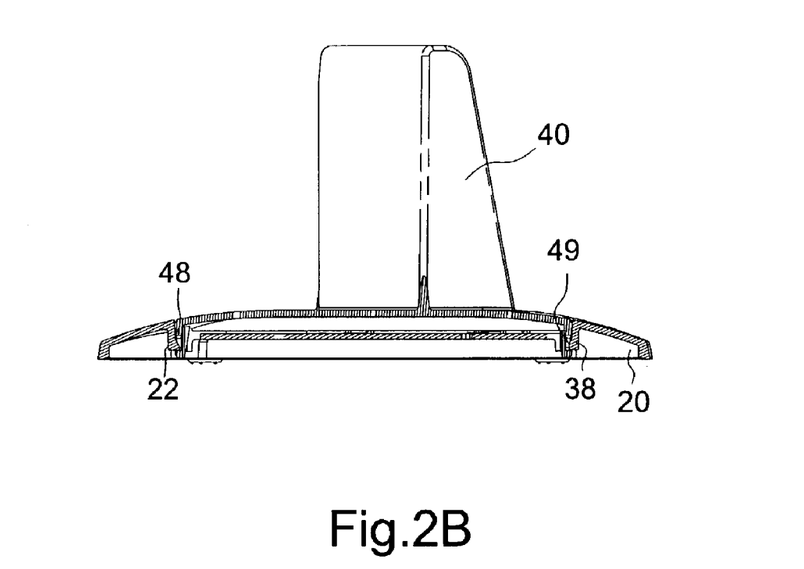
FIG. 2B illustrates a cross-sectional view of FIG. 2A.

FIGS. 2A and 2B respectively illustrate a perspective view and a cross-sectional view of the detachable base support of the first embodiment. When the base plate 20 and the support 40 are connected, the protrusion 42 of the support 40 is accommodated in the space 30 of the base plate 20. The latch 10 guided by the guiding structure 24 passes through the opening 34 of the reinforce structure 32 and moves to a first position, i.e. locked position, on the base plate 20. In other words, the narrower portion 14 of the latch 10 passes the latch hole 44 of the protrusion 42 to fix the support 40 onto the base plate 20. When the latch 10 is in the locked position, the latch 10 is constrained and supported by portions of the protrusion 42 around the latch hole 44, so that the latch 10 is confined to the latch hole 44. Furthermore, when the positioning hole 16 of the latch 10 receives the bump 26 of the base plate 20, the latch 10 is positioned in the locked position. At the same time, the holes 50 of the support 40 respectively engage with the hook 22 and the hook 38 of the base plate 20. As shown in FIG. 2B, the hook 22 and the hook 38 respectively include a clip 48 and a clip 49. The slop of the clip 48 is larger than that of the clip 49.

As the latch 10 guided by the guiding structure 24 moves to a second position, i.e. unlocked position, the base plate 20 can be detached from the support 40. In other words, the narrower portion 14 of the latch 10 is positioned out of the latch hole 44 of the protrusion 42, which allows the base plate 20 to be detached from the support 40. When the support 40 and the base plate 20 are respectively applied a force and an opposite force to two side edges proximate to the latch 10, the support 40 is detached from the base plate 20. Furthermore, the stopper 28 provided on the base plate 20 defines the second position. As the latch 10 moves to the unlocked position, the stopper 28 touches the latch 10 to stop the latch 10 moving further. Moreover, when the latch 10 moves to the second position, the bump 26 is located within the positioning hole 17, which defines the unlocked position of the latch 10. When a force is applied to detach the base plate 20 from the support 40, because the hook 22 has the clip 48 with a sloped surface larger than that of the clip 49 of the hook 38, the hook 38 can easily disengage from the hole 50. Therefore, the base plate 20 can be detached from the support 40.

Figure 3A:
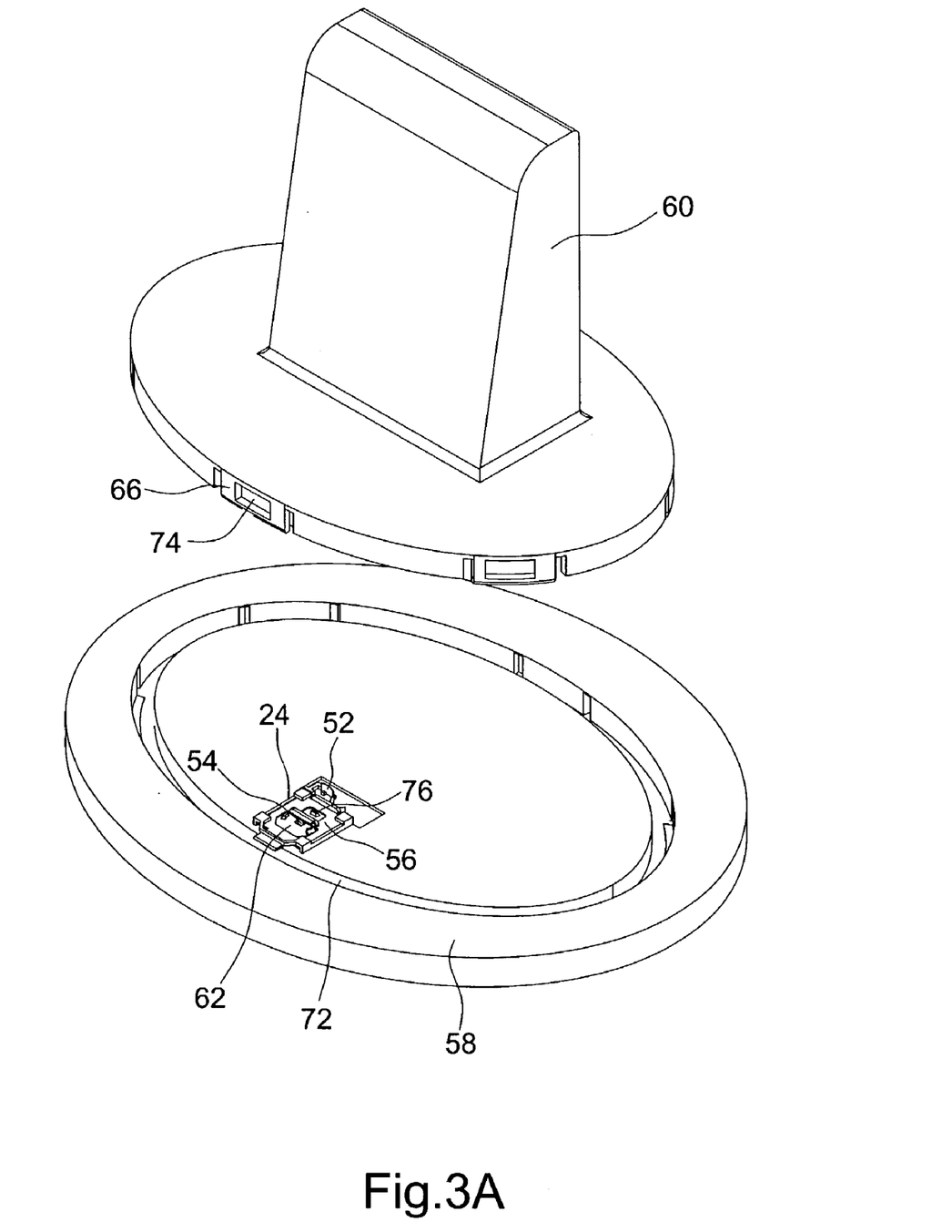
FIG. 3A illustrates an explosive view of a detachable base support in a second embodiment of the present invention.

As shown in FIG. 3A, a perspective view of an exemplary detachable base support 100 in a second embodiment is illustrated. The detachable base support 100 includes an elasticity mechanism 52 and an actuator 54, which are features different from the first embodiment. Other elements, such as latch 56, base plate 58, and support 60, are respectively modified to cooperate with the elasticity mechanism 52 and the actuator 54. For example, the stopper 28 is replaced by the elasticity mechanism 52 to control movement of the latch 56. The positioning mechanism of the bump 26 and two positioning holes (16, 17) is achieved by the relative movement of the actuator 54 and one positioning hole 62, so that the latch 56 can automatically change positions according to the status of actuator 54. The following discussions are about the aspects different from the first embodiment. Other aspects similar to the first embodiment are not elaborated again.

Figure 3B:
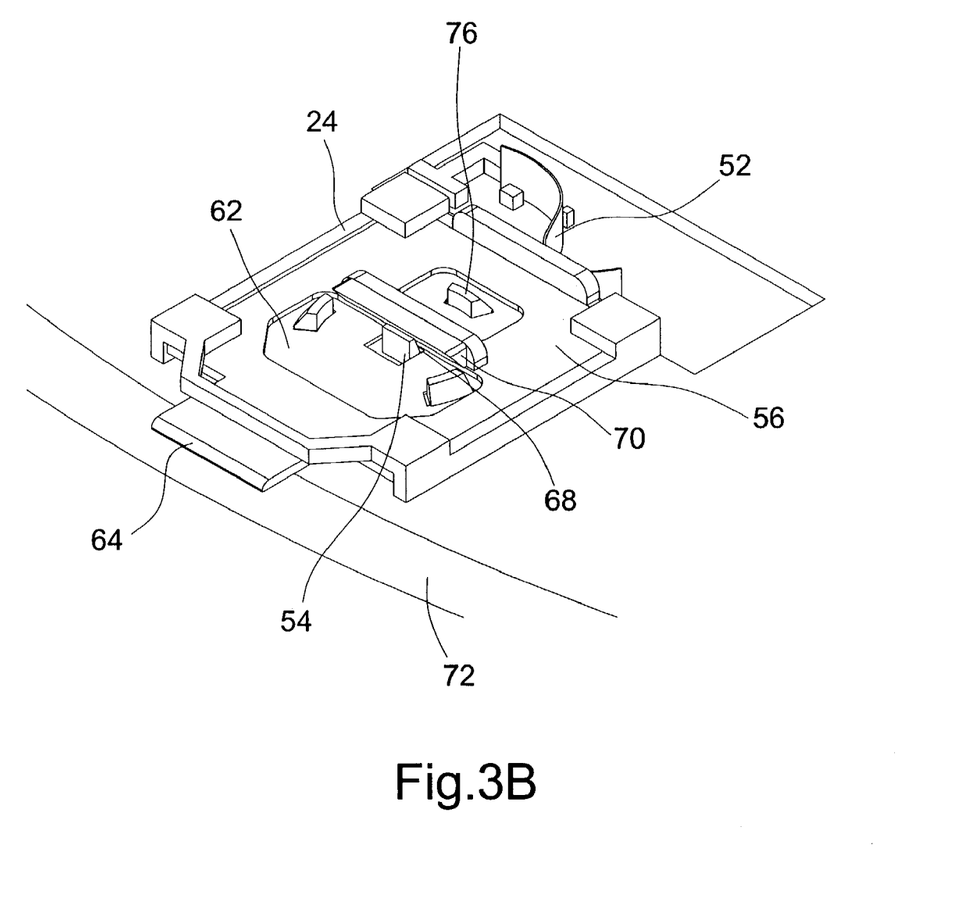
FIG. 3B illustrates a portion of an enlarged view of FIG. 3A.

FIG. 3B illustrates a portion of an enlarged view of FIG. 3A when the latch 56 is provided on the base plate 58. As shown in FIGS. 3A and 3B, the detachable base support 100 further includes the elasticity mechanism 52, such as a spring or spring leaf, which is provided on the base plate 58 and touches against one side of the latch 56. In such arrangement, the elasticity mechanism 52 can provide a force to move the latch 56 toward the space 72 to reach the first position. In other words, the latch 56 will maintain in a locked position and covers a portion of the space 72. Also referring to FIG. 4A, which is a schematic cross-sectional view of FIG. 3A, an end terminal of the latch 56 passing through the latch hole 74 includes a sloped surface 64. When the protrusion 66 of the support 60 moves into the space 72, the protrusion 66 touches against the sloped surface 64 allowing the latch 56 to move away from the first position. In other words, the protrusion 66 touches against the sloped surface 64 of the latch 56, a component of force will push the latch 56 move toward the elasticity mechanism 52 so as to allow the end terminal of the latch 56 to uncover the space 72. Therefore, the protrusion 66 is allowed to move into the space 72. When the protrusion 66 is substantially accommodated in the space 72, the elasticity mechanism 52 provides a force to move the latch 56 toward the space 72 so as to allow the end terminal of the latch 56 to be received in the latch hole 74. Therefore, the base plate 58 and the support 60 are connected.

Figure 4A:
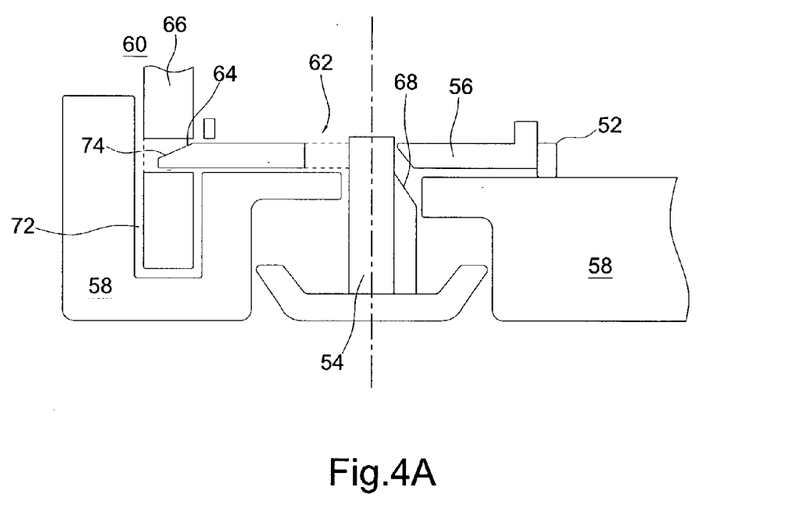
FIG. 4A illustrates a schematic cross-sectional view of FIG. 3A when the detachable base support is assembled.

Furthermore, the latch 56 further includes a positioning hole 62. The actuator 54, which has an exemplary shape like a column, passes through the base plate 58 and is located within the positioning hole 62 to touch against the latch 56. When the actuator 54 is not actuated, the column portion of the actuator 54 touches against an edge of the positioning hole 62 of the latch 56 so as to position the latch 56 in the first position, as shown in FIG. 4A. When the actuator 54 is actuated, the latch 56 moves relative to the actuator 54 so that the latch 56 moves away from the first position and the end terminal of the latch 56 is positioned out of the latch hole 74. For example, the latch 56 moves to the second position or the unlocked position, which allows the base plate 58 to be detached from the support 60, depicted as the arrowhead in FIG. 4B.

Figure 4B:
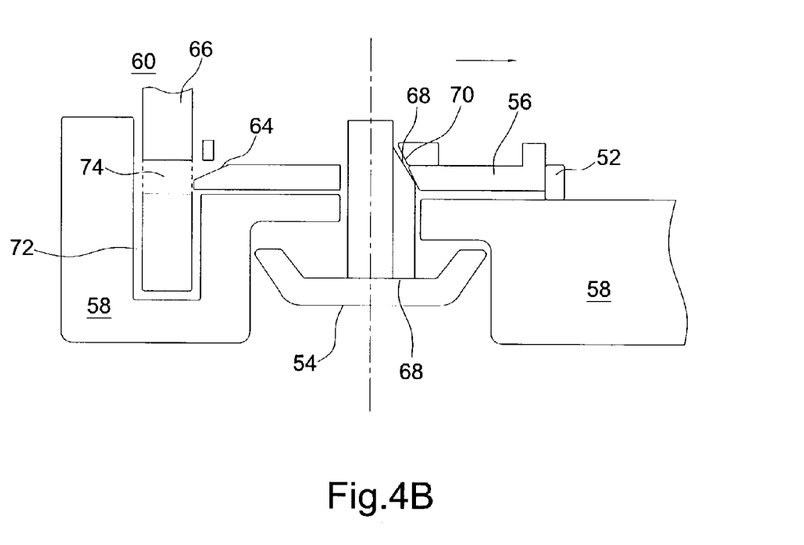
FIG. 4B illustrates a schematic view of FIG. 4A when an actuator is activated.

Furthermore, also shown in FIG. 4B, the actuator 54 includes a sloped surface 68, which touches against an edge of the positioning hole 62 of the latch 56. As the actuator 54 is actuated, the latch 56 moves away from the first position along the sloped surface 68 of the actuator 54 so that the latch 56 is positioned out of the latch hole 74 to allow the base plate 58 to be detachable from the support 60. In another embodiment, the latch 56 also has a sloped surface 70 touching against the sloped surface 68 of the actuator 54. For example, the sloped surface is provided about on the edge of the positioning hole 62 of the latch 56. As the actuator 54 is actuated, the sloped surface 68 of the actuator 54 moves relatively to the sloped surface 70 of the latch 56, so that the latch 56 moves away from the first position because of the lateral component of force of the sloped surface 68 of the actuator 54. Therefore, the latch 56 moves towards the elasticity mechanism 52 and is positioned out of the latch hole 74 so as to allow the base plate 58 to be detachable from the support 60.

The actuator 54 further includes at least one auxiliary positioning part 76, which is illustrated in FIG. 3A and not in FIG. 4A and 4B to simplify explanation. The auxiliary positioning part 76 passing through the base plate 58 and locating within the positioning hole 62 is configured to movably connect the actuator 54 and the base plate 58. For example, as the elasticity mechanism 52 provides a force to move the latch 56 to the first position, the auxiliary positioning part 76, such as a hook-like protrusion, touches against the base plate 58 to increase the contact area between the actuator 54 and the base plate 58, which enhances the connection between the actuator 54 and the base plate 58. As the actuator 54 is actuated, the auxiliary positioning part 76 moves away from the base plate 58 allowing the latch 56 to move.

Although specific embodiments have been illustrated and described, it will be obvious to those skilled in the art that various modifications may be made without departing from what is intended to be limited solely by the appended claims.

What is claimed is:

1. A detachable base support for a display device, comprising:

a support including a protrusion, the protrusion having a latch hole;

a base plate having a space for accommodating the protrusion and having an engaging surface for stably engaging a supporting surface;

a latch movably connected to the base plate, the latch comprising a positioning hole; and an actuator passing through the base plate and locating within the positioning hole to touch against the latch;

wherein as the protrusion is received in the space, the latch moves to a first position allowing the latch to pass through the latch hole for fixing the support onto the base plate, and at least part of the support substantially vertically extends above the base plate so as to support the display device.

2. The detachable base support of claim 1, wherein the base plate further comprises a guiding structure for guiding the latch to move to the first position.

3. The detachable base support of claim 2, wherein the guiding structure further guides the latch to move to a second position where the latch is positioned out of the latch hole so as to allow the base plate to be detachable from the support.

4. The detachable base support of claim 1, wherein an end terminal of the latch passing through the latch hole includes a sloped surface, and, as the protrusion moves into the space, the protrusion touches against the sloped surface allowing the latch to move away from the first position.

5. The detachable base support of claim 1, further comprising an elasticity mechanism provided on the base plate for providing a force to move the latch toward the first position.

6. The detachable base support of claim 1, wherein the actuator includes a sloped surface touching against an edge of the positioning hole, and, as the actuator is actuated, the latch moves away from the first position along the sloped surface so that the latch is positioned out of the latch hole to allow the base plate to be detachable from the support.

7. The detachable base support of claim 1, wherein the actuator includes a first sloped surface, the latch includes a second sloped surface touching against the first sloped surface, as the actuator is actuated, the first sloped surface moves relatively to the second sloped surface so that the latch moves away from the first position to allow the base plate to be detachable from the support.

8. The detachable base support of claim 1, wherein the actuator further includes an auxiliary positioning part passing through the base plate and locating within the positioning hole to touch against the base plate.

9. The detachable base support of claim 1, wherein the base plate defines a central reference axis, the base plate includes a first hook provided on a first side of the base plate, the latch is on a second side opposite to the first side with respect to the central reference axis, and the support includes a first hole for receiving the first hook as the protrusion is received in the space.

10. The detachable base support of claim 9, wherein the base plate includes a second hook provided on the second side of the base plate opposite to the first hook, and the support includes a second hole for receiving the second hook as the protrusion is received in the space.

11. The detachable base support of claim 10, wherein the first hook and the second hook respectively include a first clip and a second clip, and a slope of the first clip is larger than a slope of the second clip.

12. A detachable base support for use with a monitor device, comprising:

a support including a protrusion, the protrusion having a latch hole;

a base plate having a guiding structure and a space for receiving the protrusion and having an engaging surface for stably engaging a supporting surface;

a latch movably connected to the guiding structure, the latch comprising a positioning hole; and an actuator passing through the base plate and locating within the positioning hole to touch against the latch;

wherein as the protrusion is received in the space, the guiding structure guides the latch moving to a first position allowing the latch to pass through the latch hole for fixing the support onto the base plate, and at least part of the support substantially vertically extends above the base plate so as to support the monitor device.

13. The detachable base support of claim 12, wherein the guiding structure further guides the latch to move to a second position where the latch is positioned out of the latch hole so as to allow the base plate to be detachable from the support.

14. The detachable base support of claim 12, wherein an end terminal of the latch passing through the latch hole includes a sloped surface, and, as the protrusion moves into the space, the protrusion touches against the sloped surface allowing the latch to move away from the first position.

15. The detachable base support of claim 12, further comprising an elasticity mechanism provided on the base plate for providing a force to move the latch toward the first position.

16. The detachable base support of claim 12, wherein the actuator includes a sloped surface touching against an edge of the positioning hole, and, as the actuator is actuated, the latch moves away from the first position along the sloped surface so that the latch is positioned out of the latch hole to allow the base plate to be detachable from the support.

17. The detachable base support of claim 12, the actuator includes a first sloped surface, the latch includes a second sloped surface touching against the first sloped surface, as the actuator is actuated, the first sloped surface moves relatively to the second sloped surface so that the latch moves away from the first position to allow the base plate to be detachable from the support.

18. The detachable base support of claim 12, wherein the actuator further includes an auxiliary positioning part passing through the base plate and locating within the positioning hole to touch against the base plate.

19. A detachable base support for use with a monitor device, comprising:

a support including a protrusion, the protrusion having a latch hole;

a base plate having a space for receiving the protrusion and having an engaging surface for stably engaging a supporting surface;

a latch, movably disposed on the base plate, having a positioning hole;

an elasticity mechanism provided on the base plate; and an actuator passing through the base plate and locating within the positioning hole to touch against the latch;

wherein as the protrusion is received in the space, the elasticity mechanism applies a force to move the latch to a first position and to make the latch passing through the latch hole for fixing the support onto the base plate, and at least part of the support substantially vertically extends above the base plate so as to support the monitor device, and as the actuator is actuated, the latch is moved away from the first position allowing the latch to be positioned out of the latch hole.

20. The detachable base support of claim 19, wherein an end terminal of the latch passing through the latch hole includes a sloped surface, and, as the protrusion moves to space, the protrusion touches against the sloped surface allowing the latch to move away from the first position.

21. The detachable base support of claim 19, wherein the actuator includes a sloped surface touching against an edge of the positioning hole, and, as the actuator is actuated, the latch moves away from the first position along the sloped surface so that the latch is positioned out of the latch hole to allow the base plate to be detachable from the support.

22. The detachable base support of claim 19, the actuator includes a first sloped surface, the latch includes a second sloped surface touching against the first sloped surface, as the actuator is actuated, the first sloped surface moves relatively to the second sloped surface so that the latch moves away from the first position to allow the base plate to be detachable from the support.

23. The detachable base support of claim 19, wherein the actuator further includes an auxiliary positioning part passing through the base plate and locating within the positioning hole to touch against the base plate.

* * * * *